Figure 1:
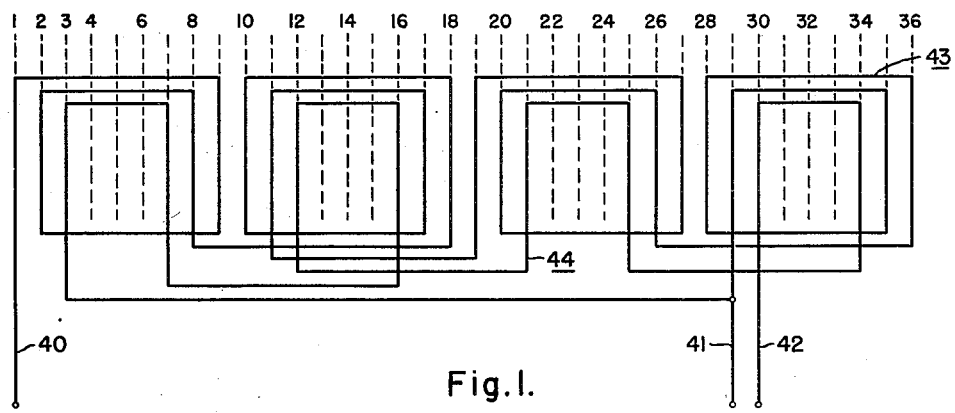

May 16, 1950     J. C. BURDETT     2,508,143
SINGLE-PHASE ELECTRIC MOTOR

Filed Aug. 17, 1948

WITNESSES:
Robert C. Baird
Frw. C. Groove

INVENTOR
John C. Burdett.
BY J. P. Lyle
ATTORNEY

Patented May 16, 1950

2,508,143

UNITED STATES PATENT OFFICE 2,508,143

SINGLE PHASE ELECTRIC MOTOR

John C. Burdett, Lima, Ohio, assignor to Westinghouse Electric Corporation, East Pittsburgh, Pa., a corporation of Pennsylvania Application August 17, 1948, Serial No. 44,640

6 Claims. (Cl. 318—225)

The present invention relates to single-phase electric motors, and more particularly to a single-phase induction motor having a tapped main primary winding.

Single-phase induction motors are sometimes used in applications in which a relatively high torque is required for short periods. One example of such an application is the driving motor for automatic washing machines, in which the tub or basket containing the clothes is rotated at one speed for washing and at a considerably higher speed for drying. The motor which drives the basket must be capable of developing a relatively high torque for accelerating the basket from the washing speed to the drying speed, but since this high torque is required only for relatively short periods, it is not economically desirable to use a motor which is capable of developing this high torque continuously. In this and similar applications, in which high torques are required only for short periods, a smaller motor is usually used which is capable of developing the lower torque required for the greater part of the operating cycle, and which is provided with a tapped main primary winding, so that one section of the winding can be cut out when the high torque is needed, thus, in effect, increasing the voltage on the remaining section of the winding and increasing the torque.

The usual type of tapped main winding, which has been used heretofore, consists of two winding sections having the same number of coils and the same winding distribution, and disposed in the same slots of the stator, the only difference in the two sections being that one section has a smaller number of turns in each coil than the other. These two sections are connected in series, with a tap connection between the two sections, so that the section having the smaller number of turns can be cut out to obtain increased torque. This type of winding is relatively expensive, however, because it is not readily adaptable to machine winding and must be wound in the slots by hand, since it consists essentially of two complete windings which must be inserted in the slots one after the other. Thus, a winding of this type involves relatively high labor cost. Another disadvantage of this conventional type of tapped winding is that in some parts of the winding there is nearly full line voltage between adjacent turns of different sections which lie in the same slots, and it is necessary to insulate at least one section for the full line voltage, thus further increasing the cost.

The principal object of the present invention is to provide a tapped main primary winding for single-phase induction motors which is relatively inexpensive, and which can be provided at substantially the same cost as a conventional untapped winding.

Another object of the invention is to provide a tapped main primary winding for single-phase induction motors in which each pole of the winding consists of a plurality of coils, and in which at least one coil of each pole is connected separately to corresponding coils of all the other poles to form one section of the winding, with the remaining coils of all the poles connected together to form the other section. This winding can, therefore, be wound at low cost in the same manner as a conventional untapped winding, and is readily adaptable to machine winding, since it differs from the conventional winding only in the connections between coils. Since the arrangement of the winding is similar to that of the usual untapped winding, no extra insulation is required, and the cost of the winding is not substantially greater than that of conventional windings.

Figure 2:
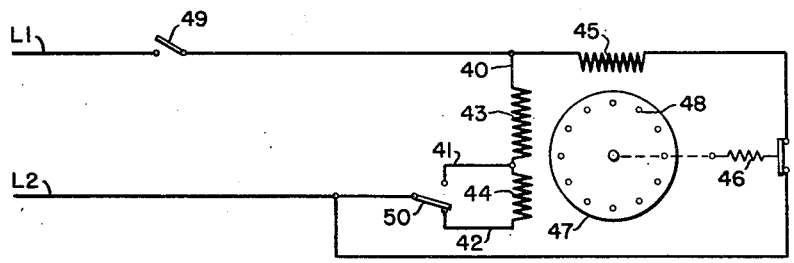

Other objects and advantages of the invention will be apparent from the following detailed description, taken in connection with the accompanying drawing, in which:

Figure 1 is a diagrammatic developed view of a main primary winding for a single-phase induction motor embodying the invention; and Fig. 2 is a schematic diagram showing the electrical connections of the motor.

The drawing shows the invention embodied in a single-phase induction motor of the split-phase type. Fig. 1 shows the main primary winding of a four-pole motor having thirty-six stator slots and three coils per pole. The stator slots are indicated diagrammatically in Fig. 1 by dotted lines, and are numbered from 1 to 36 inclusive. The main primary winding only is shown in this figure, the auxiliary or starting winding being omitted to avoid confusion, since any suitable type of starting winding may be used. Although a four-pole winding has been shown, it will be obvious that the invention can be applied to motors having any desired number of poles, and any suitable number of stator slots. As shown in Fig. 1, each pole of the winding consists of three concentric coils. Thus, the first pole at the left of Fig. 1 comprises a coil lying in slots 1 and 9, a coil lying in slots 2 and 8, and a coil lying in slots 3 and 7. The other three poles of the winding are exactly similar, with adjacent poles wound in opposite directions in the usual manner to obtain opposite instantaneous polarities. Single-turn coils have been shown to simplify the drawing, but it will be understood that in an actual winding each coil will usually have a relatively large number of turns.

In accordance with the present invention, the winding is divided into two sections. One section consists of the two outside coils of each pole, the corresponding coils of all the poles being connected in series. Thus, the two outside coils of the first pole at the left of Fig. 1, which are connected to each other in series, are connected between a terminal lead 40 and the two series-connected outside coils of the second pole, which in turn are connected to the series-connected outside coils of the third pole, and so on throughout the winding, the two outside coils of all the poles thus being connected in series between the terminal lead 40 and a tap connection 41. The inside coils of all four poles are separately connected together in series between the tap connection 41 and a terminal lead 42. It will be apparent from Fig. 1 that all the coils are connected in series between the leads 40 and 42, so that the winding is electrically equivalent to a conventional untapped winding, but that the winding is divided into two sections 43 and 44, the section 43 comprising the two outside coils of all the poles, and the section 44 comprising the inside coils of all the poles, with a tap connection 41 between the two sections.

The tapped main primary winding, consisting of the two sections 43 and 44, is shown in Fig. 2 in a single-phase motor of the split-phase type, which also includes an auxiliary or starting winding 45, which is physically displaced on the primary member or stator from the main primary winding, and which is connected in parallel with the main winding by means of a speed-responsive switch 46 of any suitable type. The motor also has a rotor member 47 carrying a secondary winding 48, which is shown as a squirrel-cage winding. The motor is connected to a single-phase supply line L1, L2, preferably through a line switch 49, and one side of the primary winding is shown as being connected to the line through a selector switch 50, which may connect the line alternatively either to the terminal lead 42 or to the tap connection 41.

In operation, the motor will usually operate with the terminal lead 42 connected to the line, as shown in the drawing, so that the motor develops its normal torque and operates as a normal split-phase motor, the speed-responsive switch 46 disconnecting the auxiliary winding 45 from the line when the motor comes up to speed. When a high torque is required for a short period, however, the switch 50 is moved, either manually or automatically, to connect the tap connection 41 to the line, thus cutting out the section 44 of the main winding and increasing the voltage on the remaining section 43 of the winding so that increased torque is obtained.

It should now be apparent that a tapped main primary winding has been provided for single-phase induction motors which can be produced more easily and cheaply than the tapped windings which have been utilized heretofore. Thus, the new winding is readily adaptable to machine winding, since it differs from an ordinary untapped winding only in the connections between coils, and can be wound in the same manner as an ordinary winding except that longer loops than usual are provided between the inside coil and the intermediate coil of each pole. After the winding operation is completed, these loops are cut and the coils connected in the manner shown in Fig. 1. Even if wound by hand, therefore, the cost of the new winding is considerably less than that of the previous type of tapped winding, while a much greater reduction in cost is obtainable by machine winding, which could not readily be done with the old type of winding. It will also be seen that no extra insulation is required, since there are no high voltages between adjacent turns in the same slots. Thus, a relatively inexpensive tapped winding has been provided which avoids the disadvantages of the tapped windings previously used.

A preferred embodiment of the invention has been shown and described for the purpose of illustration, but it will be understood that various modifications and other embodiments are possible. Thus, the invention may be applied to windings having any number of poles and having other winding distributions or numbers of coils. The invention is not limited to concentric coil windings, but may be applied to windings of other types, and may be used in any type of single-phase induction motor. It is to be understood, therefore, that the invention is not limited to the specific arrangement shown, but in its broadest aspects, it includes all equivalent embodiments and modifications which come within the scope of the appended claims.

I claim as my invention:

1. A single-phase induction motor having a main primary winding and an auxiliary primary winding disposed on a slotted primary member, said main primary winding being a two-section, multipolar winding, each pole of the winding comprising a plurality of coils lying in different slots, certain of the coils of each pole being connected together and to the corresponding coils of the other poles to form one section of the winding and the remaining coils being separately connected together to form the other section of the winding, means for connecting said two sections in series, and a tap connection between the two sections for cutting out the last-mentioned section.

2. A single-phase induction motor having a main primary winding and an auxiliary primary winding disposed on a slotted primary member, said main primary winding being a two-section, multipolar windings, each pole of the winding comprising a plurality of coils lying in different slots, all but one of the coils of each pole being connected together and to the corresponding coils of the other poles to form one section of the winding, and the remaining coils being separately connected together to form the other section of the winding, means for connecting said two sections in series, and a tap connection between the two sections for cutting out the last-mentioned section.

3. A single-phase induction motor having a main primary winding and an auxiliary primary winding disposed on a slotted primary member, said main primary winding being a two-section, multipolar winding, each pole of the winding comprising a plurality of coils disposed concentrically in different slots, certain of the coils of each pole being connected together and to the corresponding coils of the other poles to form one section of the winding and the remaining coils being separately connected together to form the other section of the winding, means for connecting said two sections in series, and a tap connection between the two sections for cutting out the last-mentioned section.

4. A single-phase induction motor having a main primary winding and an auxiliary primary winding disposed on a slotted primary member, said main primary winding being a two-section, multipolar winding, each pole of the winding comprising a plurality of coils disposed concentrically in different slots, the inside coils of all the poles being connected together to form one section of the winding and the remaining coils of each pole being connected together and to the corresponding coils of the other poles to form the other section of the winding, means for connecting said two sections in series, and a tap connection between the two sections for cutting out the first-mentioned section.

5. A single-phase induction motor having a main primary winding and an auxiliary primary winding disposed on a slotted primary member, said main primary winding being a two-section, multipolar winding, each pole of the winding comprising a plurality of coils lying in different slots, certain of the coils of each pole being connected together and to the corresponding coils of the other poles to form one section of the winding and the remaining coils being separately connected together to form the other section of the winding, means for connecting said two sections in series, a tap connection between the two sections, means for connecting the free end of the first-mentioned section to one side of a single-phase supply line, and means for alternatively connecting the other side of the supply line to the free end of the other section or to said tap connection.

6. A single-phase induction motor having a main primary winding and an auxiliary primary winding disposed on a slotted primary member, said main primary winding being a two-section, multipolar winding, each pole of the winding comprising a plurality of coils disposed concentrically in different slots, the inside coils of all the poles being connected together to form one section of the winding and the remaining coils of each pole being connected together and to the corresponding coils of the other poles to form the other section of the winding, means for connecting said two sections in series, a tap connection between the two sections, means for connecting the free end of the last-mentioned section to one side of a single-phase supply line, and means for alternatively connecting the other side of the supply line to the free end of the first-mentioned section or to said tap connection.

JOHN C. BURDETT.

REFERENCES CITED

The following references are of record in the file of this patent:

UNITED STATES PATENTS

| Number | Name | Date |
|---|---|---|
| 661,464 | Aldrich et al. | Nov. 6, 1900 |
| 1,933,497 | Morrill | Oct. 31, 1933 |
| 2,203,927 | Rutherford | June 11, 1940 |

FOREIGN PATENTS

| Number | Country | Date |
|---|---|---|
| 368,246 | Great Britain | Aug. 29, 1930 |